US011112871B2

United States Patent
Wang et al.

(10) Patent No.: US 11,112,871 B2
(45) Date of Patent: Sep. 7, 2021

(54) DISPLAY PANEL, DISPLAY DEVICE AND DEFORMATION UNIT WITH HAPTIC FEEDBACK

(71) Applicant: BOE Technology Group Co., Ltd., Beijing (CN)

(72) Inventors: Jiabin Wang, Beijing (CN); Xiaoliang Ding, Beijing (CN); Yangbing Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/910,681

(22) Filed: Jun. 24, 2020

(65) Prior Publication Data
US 2021/0018983 A1 Jan. 21, 2021

(30) Foreign Application Priority Data
Jul. 17, 2019 (CN) .......................... 201910649562.1

(51) Int. Cl.
*G06F 3/01* (2006.01)
*B06B 1/06* (2006.01)
*G06F 3/041* (2006.01)

(52) U.S. Cl.
CPC ............ *G06F 3/016* (2013.01); *B06B 1/0603* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 2010/0079264 A1* | 4/2010 | Hoellwarth ............. | G06F 3/041 340/407.2 |
| 2015/0169118 A1* | 6/2015 | Lee .......................... | G06F 3/041 345/174 |
| 2018/0275757 A1* | 9/2018 | Cruz-Hernandez .......................... | H01L 27/323 |

\* cited by examiner

*Primary Examiner* — Carl Adams
(74) *Attorney, Agent, or Firm* — Myers Bigel, P.A.

(57) ABSTRACT

A display panel is disclosed. The display panel includes a back plate, a plurality of pixel units formed on the back plate, and a plurality of deformation units for providing haptic feedback. Each deformation unit is on one or more corresponding pixel units of the plurality of pixel units, and when being applied a drive voltage, undergoes a deformation corresponding to a haptic feature of a visual object displayed by the corresponding pixel units. Thereby, there is provided a display panel with haptic feedback, which is simple in structure and easy to implement.

18 Claims, 5 Drawing Sheets

DISPLAY PANEL, DISPLAY DEVICE AND DEFORMATION UNIT WITH HAPTIC FEEDBACK

RELATED APPLICATION

The present application claims the benefit of Chinese Patent Application No. 201910649562.1, filed on Jul. 17, 2019, the entire disclosure of which is incorporated herein by reference.

FIELD

The present disclosure generally relates to the technical field of haptic feedback, and particularly to a display panel, a display device and a deformation unit with haptic feedback.

BACKGROUND

Currently, more and more researchers are dedicated to research of haptic feedback technology, and have successfully developed many types of haptic feedback techniques for 2-dimensional screens. These haptic feedback techniques may provide a user with effective haptic excitation of a corresponding displayed object according to the position of the user's finger. However, known haptic feedback techniques still have some technical drawbacks, and main problems focus on aspects such as failure to be integrated with the screen, a complicated algorithm used, high hardware requirements and difficult implementation. These technical drawbacks affect the user's acceptance of the haptic feedback techniques, and also limit the application of haptic feedback techniques to the screen.

SUMMARY

According to an aspect of the embodiments of the present disclosure, a display panel is provided. The display panel includes a back plate, a plurality of pixel units formed on the back plate, and a plurality of deformation units for providing haptic feedback. Each deformation unit is disposed on one or more corresponding pixel units of the plurality of pixel units, and when being applied a drive voltage, undergoes a deformation corresponding to a haptic feature of a visual object displayed by the corresponding pixel units.

In some embodiments, the deformation unit includes a substrate, a deformable assembly made of a piezoelectric material on the substrate, and a drive electrode for receiving the drive voltage. The deformable assembly includes a free terminal and a fixed terminal. The fixed terminal is attached to the substrate and connected to the drive electrode, and the free terminal undergoes a deformation with a corresponding strength in response to a change in the drive voltage.

In some embodiments, the deformation unit further includes a deformation drive circuit formed on the back plate. The deformation drive circuit includes: a drive unit configured to receive a deformation data signal and output the drive voltage based on the deformation data signal; a maintain unit configured to receive the drive voltage from the drive unit, and supply the drive voltage to the drive electrode during the display via the one or more corresponding pixel units of the deformation unit, so that the deformation unit undergoes a deformation and maintains the deformation; a reset unit configured to receive a reset signal, and reset the maintain unit in response to the reset signal, so that the maintain unit stops supplying the drive voltage to cause the deformable assembly to restore to its original state.

In some embodiments, the deformation data signal is a display data signal for driving the corresponding pixel units to display. The drive unit is configured to output the drive voltage when the display data signal is at an active level.

In some embodiments, the drive unit is further configured to receive a row scanning signal. The drive unit is configured to output the drive voltage based on the deformation data signal when the row scanning signal is active, and wherein a magnitude of the drive voltage varies with the deformation data signal.

In some embodiments, the drive unit includes a deformation drive transistor and a first storage capacitor. The deformation drive transistor comprises a gate receiving the display data signal, a first electrode connected to a power supply voltage, and a second electrode connected to the drive electrode of the deformation unit. The first storage capacitor comprises a first terminal connected to the second electrode of the deformation drive transistor and the drive electrode, and a second terminal that is grounded.

In some embodiments, the reset unit includes a reset transistor. The reset transistor includes a gate receiving a reset signal, a first electrode connected to the first terminal of the first storage capacitor, and a second electrode that is grounded.

In some embodiments, the drive unit further includes an isolation diode which includes a first terminal receiving the display data signal and a second terminal connected to the gate of the deformation drive transistor.

In some embodiments, the drive unit includes a deformation drive transistor and a first storage capacitor. The deformation drive transistor comprises a gate receiving the row scanning signal, a first electrode receiving the deformation data signal, and a second electrode connected to the drive electrode of the deformation unit. The first storage capacitor comprises a first terminal connected to the second electrode of the deformation drive transistor and the drive electrode, and a second terminal that is grounded.

In some embodiments, a top plate is provided on the plurality of pixel units, and the top plate serves as the substrate of the deformation unit.

According to another aspect of the embodiments of the present disclosure, there is provided a display device including the display panel as described above.

According to a further aspect of the embodiments of the present disclosure, there is provided a deformation unit for providing haptic feedback. The deformation unit includes a substrate; a deformable assembly made of a piezoelectric material and attached to the substrate and a drive electrode for receiving a drive voltage. The deformable assembly includes a free terminal and a fixed terminal. The fixed terminal is attached to the substrate and connected to the drive electrode, and the free terminal undergoes a deformation with a certain strength in response to a change in the drive voltage.

BRIEF DESCRIPTION OF THE DRAWINGS

The above and other features and advantages of the present disclosure will become more apparent when described in detailed exemplary embodiments thereof with reference to the attached drawings in which.

DETAILED DESCRIPTION

Figure 1A:
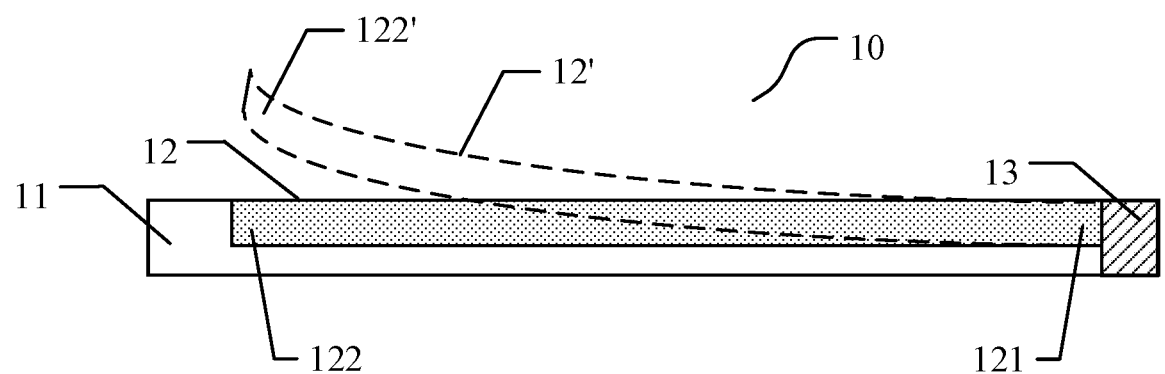
FIG. 1A shows an exemplary structural diagram of a deformation unit according to an embodiment of the present disclosure.

In the following description, certain specific details of the disclosed embodiment such as architecture, interfaces and techniques, etc., are set forth for purposes of explanation rather than limitation, so as to provide a clear and thorough understanding of the present disclosure. However, it should be understood readily by those skilled in this art, that the present disclosure may be practiced in other embodiments which do not conform exactly to the details set forth herein, without departing significantly from the spirit and scope of this disclosure. Further, in this context, and for the purpose of brevity and clarity, detailed descriptions of well-known apparatus, circuits and methodology have been omitted so as to avoid unnecessary detail and possible confusion.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Unless otherwise defined, the technical or scientific terms used in the present disclosure should have usual meanings understood by those having ordinary skill in the field to which the invention belongs. "Connected" or "coupled" and similar words are not limited to physical or mechanical connections, but may include electrical connections, whether direct connections or indirect connection. "Above", "below", "left", "right", etc. are only used to indicate the relative positional relationship. When the absolute position of the described object changes, the relative positional relationship may also change accordingly.

It should be noted that the embodiments in the present disclosure and the features in the embodiments can be combined with each other in the absence of conflicts. The disclosure will be described in detail below with reference to the figures and in conjunction with the embodiments.

The haptic feedback technology may provide a user with an effective haptic excitation for a corresponding displayed object on a screen according to the position of the user's finger on the screen. The use of haptic feedback technology in the user interaction interface may effectively reduce the user's visual pressure, reduce the interaction error rate, and enrich the user's interactive experience.

In the haptic feedback technology, a rendering and generation algorithm is usually used to extract image texture of an interaction interface displayed on the screen, a drive signal is obtained by mapping with an interaction model of a hand, and the drive signal is sent to a haptic feedback device to generate an excitation in order to complete haptic information rendering. On the basis of implementing the haptic feedback technology, it is also possible to improve the reality of interaction by optimizing the haptic feedback process.

The haptic feedback technology applied for a two-dimensional screen includes, for example, deformation, electrostatic force, vibration, electrical stimulation, piezoelectricity, etc. FIG. 1A shows an exemplary structural diagram of a deformation unit according to an embodiment of the present disclosure. As shown in FIG. 1A, the deformation unit 10 may include a substrate 11, a deformable assembly 12 and a drive electrode 13.

The substrate 11 may be a glass substrate.

The deformable assembly 12 is disposed on the substrate 11. In some embodiments, the deformable assembly 12 may be formed by attaching a piezoelectric material, such as a graphene material, to the substrate 11. Since the piezoelectric material has a unique physical property of deforming when an electric field is applied, deformation strength of the deformable assembly made of the piezoelectric material may be modulated by changing the electric field. Exemplarily, the deformable assembly 12 may include a deformable strip made of a graphene material. The deformable strip includes a fixed terminal 121 and a free terminal 122. The fixed terminal 121 may be fixed on the substrate 11. In this way, when the deformable strip is applied with different electric fields, the free terminal 122 may undergo free deformation, such as warping. In some embodiments, the deformable assembly 12 may form a free curved surface through free deformation.

The drive electrode 13 may be connected to the deformable assembly 12 for applying different electric fields (for example, voltages) to the deformable assembly so as to drive the deformable assembly 12 to undergo deformation with a corresponding strength (for example, a corresponding warpage). Exemplarily, the drive electrode 13 may be connected to the fixed terminal 121 of the deformable strip. Additionally, the drive electrode 13 may be fixedly connected to the substrate 11.

In FIG. 1A, the deformable assembly 12' that deforms after an electric field is applied through the drive electrode 13 is schematically shown with a dashed line. The fixed terminal 121 of the deformable assembly 12' after the deformation is still on the substrate 11, but the free terminal 122' of the deformable assembly leaves the substrate 11 due to warpage. In some embodiments, when the deformable assembly is made of a graphene material, since the deformation of the graphene material is related to the voltage, the free terminal of the deformable assembly will be more warped as the applied voltage increases.

Figure 1B:
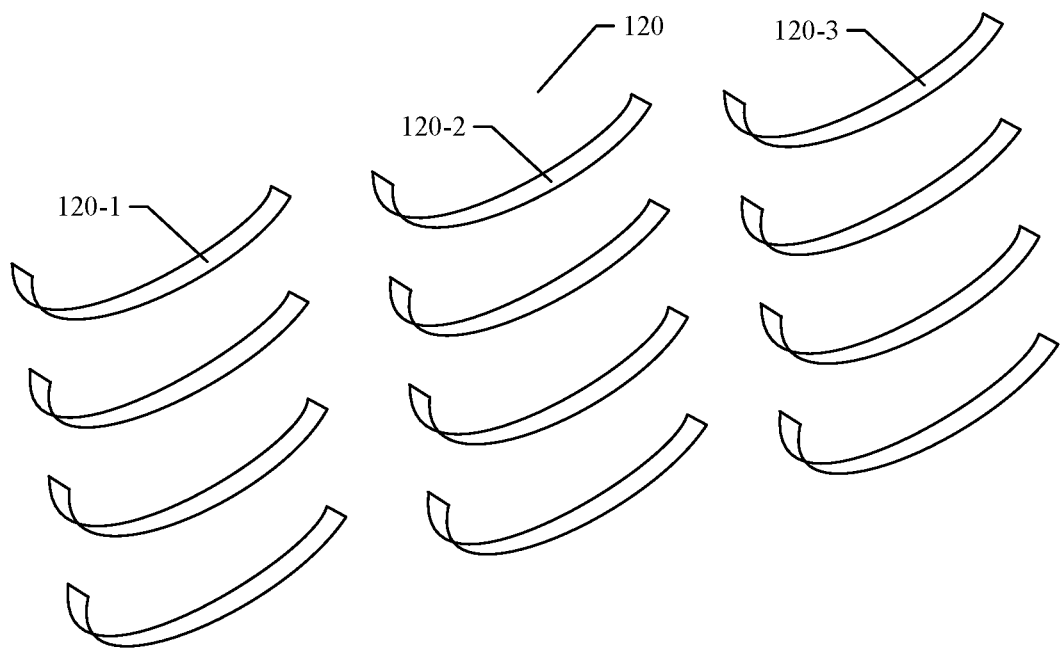
FIG. 1B shows a schematic diagram of a deformation matrix according to an embodiment of the present disclosure.

An array of a plurality of deformable assemblies may be used to form a haptic feedback matrix. FIG. 1B shows a schematic diagram of a haptic feedback matrix 120 composed of a plurality of deformable assemblies. The haptic feedback matrix 120 includes a plurality of deformable assemblies made of a graphene material, such as deformable strips 120-1, 120-2, 120-3, and so on. These deformable strips may produce corresponding deformations (such as directional deformations, e.g., warping) under the action of an electric field to change perceptible haptic features, such as shape, texture, and roughness. For example, the haptic feedback matrix may achieve a three-dimensional freeform surface with a certain resolution, thereby forming haptic feedback.

Figure 2:
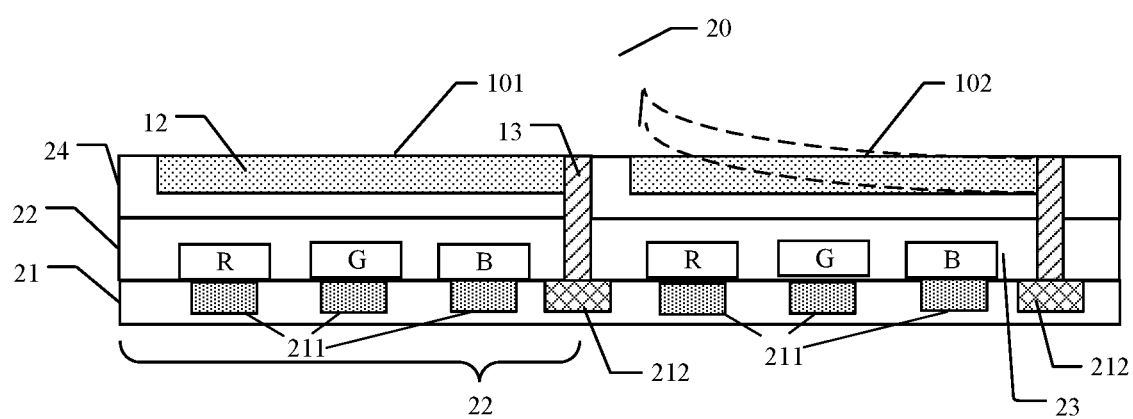
FIG. 2 shows an exemplary structural diagram of a display panel according to an embodiment of the present disclosure.

FIG. 2 shows an exemplary structural diagram of a display panel 20 according to an embodiment of the present disclosure. As shown in FIG. 2, the display panel 20 includes a back plate 21, a plurality of pixel units 22, 23 formed on the back plate 21, and a plurality of deformation units 101 and 102 provided on/above the pixel units 22, 23 and configured to provide haptic feedback.

The display panel 20 may be an OLED (Organic Light-Emitting Diode) screen. The OLED screen may employ a top-emitting OLED structure or a bottom-emitting OLED structure.

Each of pixel units 22 and 23 may include a plurality of sub-pixel units, for example, RGB sub-pixel units.

Either of the deformation units 101 and 102 may be the deformation unit 10 shown in FIG. 1A. The deformation units 101 and 102 may be disposed on one or more corresponding pixel units of the plurality of pixel units. For example, each deformation unit may correspond to one or more pixel units. In some embodiments, the deformation unit and the pixel unit(s) may employ an overlapping structure. The deformation unit may, for example, completely cover or partially cover the corresponding pixel unit(s). As shown in FIG. 2, the deformation units 101 and 102 may correspond to the pixel units 22 and 23, respectively, and are disposed above the corresponding pixel units 22 and 23

The deformation unit can be driven to undergo a deformation corresponding to the haptic feature of a visual object displayed by corresponding pixel unit(s). Exemplarily, the deformation unit can be driven to deform in a short time by being applied respective electric fields to generate for example an accurate free-form surface in a designated space. The electric field applied to a certain deformation unit may depend on for example the texture, profile and roughness of a corresponding image area. Exemplarily, the voltage applied to the deformation unit may be determined based on the display data of pixel units in the image area to complete the reconstruction of the haptic feature of the visual object in the image area.

It may be appreciated that when warping at the same height is obtained, the larger the area of the deformation unit is, the larger the voltage that needs to be applied is. The increase in voltage is an exponential increase. Moreover, for a display panel of the same area, a voltage that needs to be applied when one deformation unit is used is greater than a sum of voltages that need to be applied when two deformation units are used. Therefore, in order to obtain an effect of low power consumption, a plurality of deformation units are used in the display panel. Illustratively, the area of the deformation unit may be reduced to the pixel unit level. This makes it possible to reduce the electric energy used for driving the deformation units, and makes it possible to share part of the drive circuit resources with the pixel units.

A deformation unit 101, 102 may include a substrate, a deformable assembly 12 and a drive electrode 13. The plurality of deformation units may share the same substrate. In some embodiments, the display panel comprises a top plate 24 provided on the pixel units 22 and 23, and the top plate 24 is used as the substrate of the deformation units 101, 102.

In some embodiments, the deformable assembly in each deformation unit may be made of a graphene material, and the plurality of deformation units may form a haptic feedback matrix corresponding to the pixel unit array on the substrate.

The drive electrode 13 of the deformation unit may be connected to the back plate 21. At this time, the drive electrode 13 obtains a desired drive voltage from the back plate. In some embodiments, the drive electrode may be led from a side of the deformable assembly to the back plate by perforating the substrate.

Pixel drive circuits 211 are provided in the back plate 21 to provide pixel drive signals to respective pixel units 22, 23. In some embodiments, the back plate 21 is further provided with deformation drive circuits 212 which can provide deformation drive voltages to the drive electrodes 13 of respective deformation units 101, 102 to control the deformation of the deformable assemblies. As illustrated in FIG. 2, the deformation unit 101 keeps its original shape, while the deformation unit 102 warps. In some embodiments, the pixel drive circuits 211 and the deformation drive circuits 212 are provided in the same driving layer of the display panel.

Thus, the embodiments of the present disclosure provide a display panel with haptic feedback, which is simple in structure and easy to implement.

Figure 3:
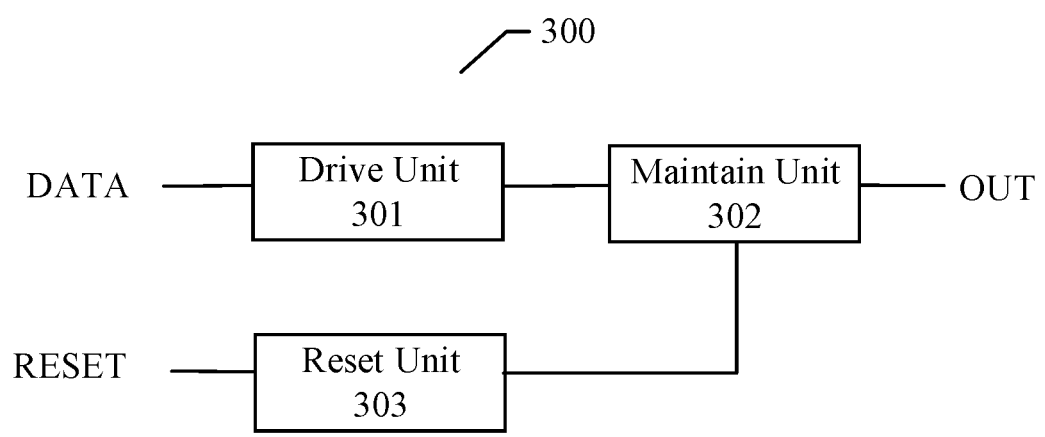
FIG. 3 shows an exemplary structural block diagram of a deformation drive circuit according to an embodiment of the present disclosure.

FIG. 3 shows an exemplary block diagram of a deformation drive circuit 300 according to an embodiment of the present disclosure. As shown in FIG. 3, the deformation drive circuit 300 includes a drive unit 301, a maintain unit 302 and a reset unit 303.

The drive unit 301 is configured to receive a deformation control signal and output a drive voltage based on the deformation data signal to control the corresponding deformation unit to deform. In some embodiments, a display data signal for driving the pixel unit(s) corresponding to the deformation unit to correspondingly display a visual object may serve as the deformation data signal. In other embodiments, the deformation data signal may be generated based on the display data of the pixel unit and its neighboring pixel units, so that the deformation of the deformation unit accurately reflects the haptic features of the visual object rendered by these pixel units. The display data is data to be used to drive the pixel unit(s) so as to display the visual object.

The maintain unit 302 is configured to receive the drive voltage from the drive unit, and supply the drive voltage to the drive electrode of the deformation unit during display via the pixel unit corresponding to the deformation unit. In some embodiments, the pixel unit includes an electroluminescent device. The drive unit 301 is configured to input the drive voltage to the maintain unit 302 when the electroluminescent device is active (for example, driven to emit light). The maintain unit 302 may be an energy storage unit, and supplies the drive voltage to the drive electrode for a required time period by storing electrical energy. The time period may for example correspond to a time period in which one frame image is displayed.

In some embodiments, the deformation unit includes a deformable assembly made of a graphene material. The deformation of the graphene material is related to the voltage, not to current. Therefore, it is possible to supply a stable drive voltage to the deformation unit by using the maintain unit, so that the deformable assembly is driven to deform and maintain the deformation state.

In some embodiments, immediately before the deformable assembly deforms next time, the applied electric field may be removed by releasing the voltage of the maintain unit, so that the deformable assembly restores to the original state, e.g., its original shape.

The reset unit 303 is configured to receive a reset signal, and reset the maintain unit under the control of the reset signal so that the maintain unit no longer supplies the drive voltage, thereby restoring the deformation unit. In some embodiments, the reset signal is received before the deformation unit undergoes a next deformation, and the supply of the drive voltage to the drive electrode is stopped by causing the maintain unit 302 to release the electrical energy. For example, the reset signal may be given before refreshing the display data, for example, before starting to display the next frame image.

In solutions according to embodiments of the present disclosure, there is provided a haptic feedback deformation unit with a simple structure. Furthermore, according to some embodiments of the present disclosure, a structure integrated with a display panel is implemented by setting the haptic feedback deformation unit to correspond to the corresponding pixel unit. Moreover, since the haptic feedback is implemented by a plurality of individual deformation units, the problem of large power consumption of a conventional haptic feedback system is solved, and an energy-saving effect is achieved.

Figure 4:
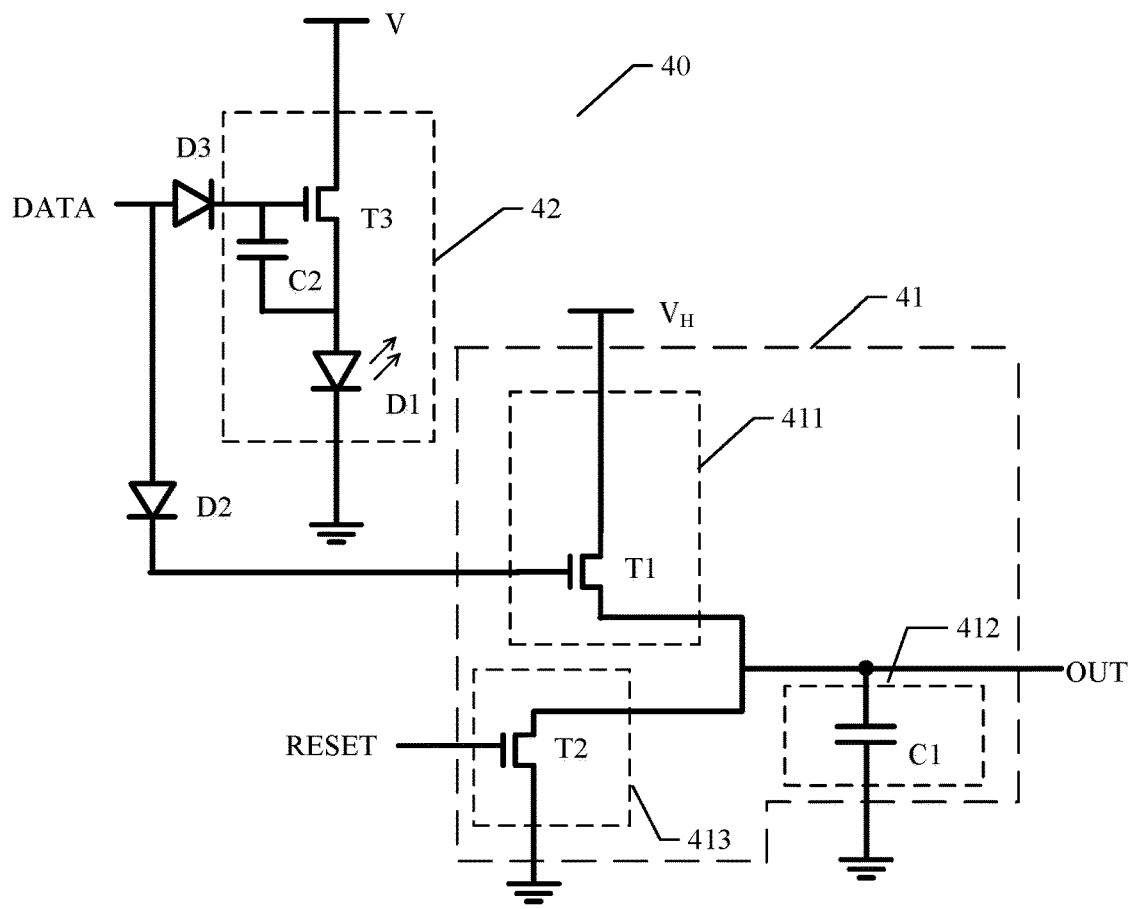
FIG. 4 shows an exemplary circuit diagram of a deformation drive circuit.

FIG. 4 shows an exemplary circuit diagram of a drive circuit 40 of the display panel. As shown in FIG. 4, the drive circuit 40 includes a deformation drive circuit 41 and a pixel drive circuit 42, which are used to drive the deformation unit and pixel unit corresponding to each other, respectively.

The deformation drive circuit 41 includes a drive unit 411, a maintain unit 412, and a reset unit 413. The drive unit 411 includes a deformation drive transistor T1. A gate of the deformation drive transistor T1 receives a display data signal DATA, a first electrode of the deformation drive transistor T1 is connected to a power supply voltage $V_H$, and a second electrode of the deformation drive transistor T1 is connected to an output terminal OUT. This display data signal is also input to the pixel drive circuit 41.

The maintain unit 412 includes a first storage capacitor C1. A first terminal of the first storage capacitor C1 is connected to the second electrode of the deformation drive transistor T1 and the output terminal OUT, and a second terminal of the first storage capacitor C1 is grounded.

The reset unit 413 includes a reset transistor T2. A gate of the reset transistor T2 receives a reset signal RESET, a first electrode of the reset transistor T2 is connected to the first terminal of the first storage capacitor C1 and the output terminal OUT, and a second electrode of the reset transistor T2 is grounded.

The pixel drive circuit 42 includes a light-emitting drive transistor T3, an electroluminescent device D1, and a second storage capacitor C2. A gate of the light-emitting drive transistor T3 receives the display data signal DATA, a first electrode of the light-emitting drive transistor T3 is connected to the second power supply voltage V, and a second electrode of light-emitting drive transistor T3 is connected to a first electrode of the electroluminescent device D1. A second electrode of the electroluminescent device D1 is grounded. A first terminal of the second storage capacitor C2 is connected to the gate of the light emitting drive transistor T3, and a second terminal of the second storage capacitor C2 is connected to the first electrode of the electroluminescent device D1.

The gate of the deformation drive transistor T1 is connected to the gate of the light-emitting drive transistor T3. In some embodiments, the gate of the deformation drive transistor T1 and the gate of the light-emitting drive transistor T3 are respectively connected to diodes D2 and D3 and receive the display data signal DATA vid the diodes D2 and D3.

The working principle of the drive circuit 40 may be described as follows.

The drive circuit 40 receives the display data signal. When the display data signal is at an active level, the deformation drive transistor T1 is turned on, the power supply voltage $V_H$ charges the first storage capacitor C1, and supplies power to the drive electrode of the deformation unit through the output terminal, so that the deformation unit undergoes a corresponding deformation.

For the light-emitting drive transistor T3, when the display data signal is at an active level, the light-emitting drive transistor T3 is turned on, and the electroluminescent device D1 is driven to emit light accordingly.

In some embodiments, the display data can be input to the drive circuit only when a row scanning signal of the pixel unit driven by the pixel drive circuit is active (i.e., the row where the pixel unit is located is being scanned). Therefore, after the scanning of the row is completed, the deformation drive transistor T1 is turned off. Nevertheless, since the amount of energy stored in the first storage capacitor C1 remains stable, the supply of the drive voltage to the deformation unit can be maintained through the first storage capacitor C1. In this way, the deformation of the deformation unit may be maintained until, for example, a next frame image is displayed.

Before the next frame image is displayed, the reset signal RESET is received. The reset signal RESET is at an active level, so that the reset transistor T2 is turned on. At this time, the first storage capacitor C1 releases electrical energy through discharge, and the drive voltage of the output terminal OUT is removed, thereby restoring the deformation unit to the original state/shape. In this way, after the next frame starts, the drive voltage value on the drive electrode of the deformation unit may be updated through the display data, and then the refresh of the shape of the deformation unit may be implemented.

In such embodiments, since both the deformation drive circuit and the pixel drive circuit implement their respective driving based on the display data, they can share part of the circuit. This simplifies the circuit complexity and achieves effective integration with existing screen structures.

Figure 5:
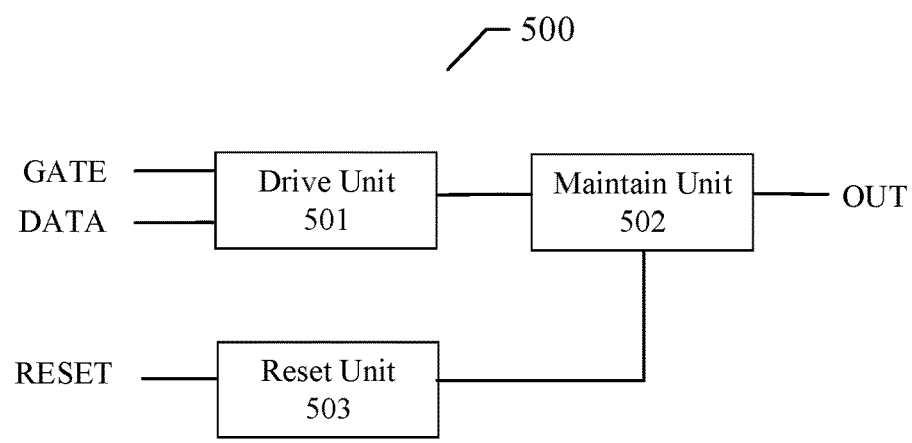
FIG. 5 shows an exemplary structural block diagram of a deformation drive circuit according to another embodiment of the present disclosure.

FIG. 5 shows an exemplary structural block diagram of a deformation drive circuit 50 according to another embodiment of the present disclosure. As shown in FIG. 5, the deformation drive circuit 50 includes a drive unit 501, a maintain unit 502 and a reset unit 503.

The drive unit 501 receives a row scanning signal GATE and a deformation data signal DATA, and, when the row scanning signal GATE is active, generates and supplies a drive voltage based on the deformation data signal DATA to drive the deformation unit to deform. The maintain unit 502 stores electrical energy through the drive voltage supplied by the drive unit 501 to maintain the supply of the drive voltage and cause the deformation unit to maintain the deformation that already occurs. The reset unit 503 receives the reset signal RESET, and when the reset signal is active, causes the maintain unit to release electrical energy, thereby removing the applied electric field to cause the deformation unit to restore to the original state/shape.

In this embodiment, the deformation drive circuit operates separately, so it is required to provide the row scanning signal GATE and the individually-set deformation data signal DATA to the deformation drive circuit. The deformation data signal may be generated based on image texture of an interaction interface displayed on the screen extracted using the rendering and generation algorithm.

According to this embodiment, since the deformation data signal is generated based on the image content, it can represent the haptic features of the visual object more accurately, thereby implementing complementation for the visual display content and enriching the user's perception experience.

Figure 6:
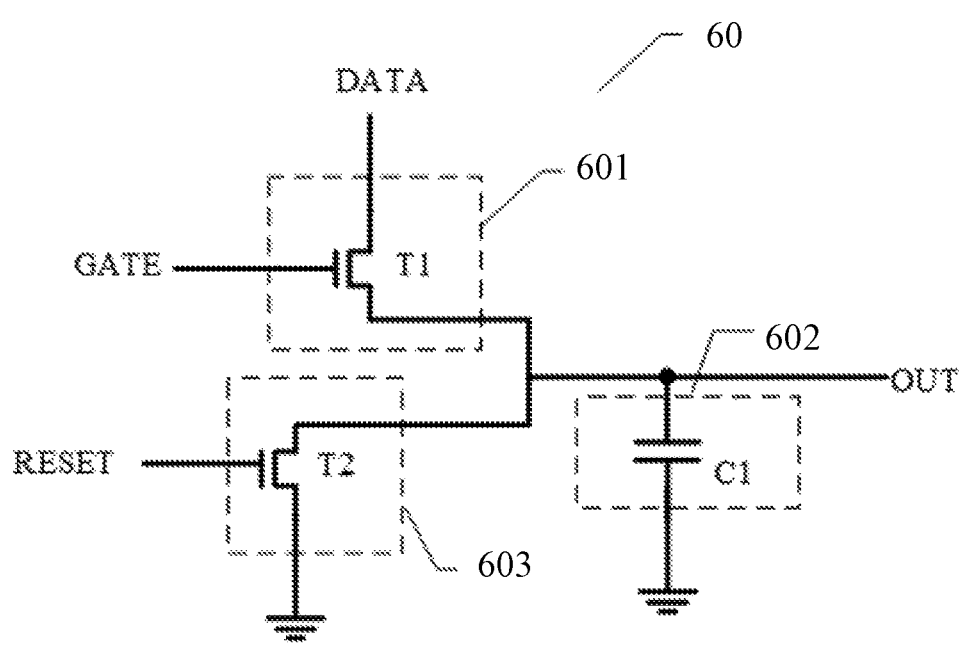
FIG. 6 shows another exemplary circuit diagram of a deformation drive circuit.

FIG. 6 shows another exemplary circuit diagram of a deformation drive circuit 60. As shown in FIG. 6, the deformation drive circuit 60 includes a drive unit 601, a maintain unit 602 and a reset unit 603. The drive unit 601 includes a deformation drive transistor T1. A gate of the deformation drive transistor T1 is connected to receive the row scanning signal GATE, the first electrode of the deformation drive transistor T1 is connected to receive the deformation data signal DATA, and the second electrode of the deformation drive transistor T1 is connected to the output terminal OUT. The output terminal OUT is connected to the drive electrode of the deformation unit.

The maintain unit 602 includes a first storage capacitor C1. A first terminal of the first storage capacitor C1 is connected to the second electrode of the deformation drive transistor T1 and the output terminal OUT, and a second terminal of the first storage capacitor C1 is grounded.

The reset unit 603 includes a reset transistor T2. A gate of the reset transistor T2 receives the reset signal RESET, a first electrode of the reset transistor T2 is connected to the first terminal of the first storage capacitor C1 and the output terminal OUT, and a second electrode of the reset transistor T2 is grounded.

The operation principle of the deformation drive circuit 60 may be described as follows.

When the row scanning signal GATE is active, the deformation drive transistor T1 is turned on, and the deformation data signal DATA charges the first storage capacitor C1 and supplies power to the drive electrode of the deformation unit through the output terminal, so that the deformation unit undergoes a corresponding deformation.

When the row scanning signal GATE is inactive, the deformation drive transistor T1 is turned off. At this time, the amount of energy stored in the first storage capacitor C1 remains stable, so the supply of the drive voltage to the deformation unit may be maintained through the first storage capacitor C1.

Before a next deformation of the deformation unit, for example, before a next frame image is displayed, the received reset signal RESET is active so that the reset transistor T2 is turned on. At this time, the first storage capacitor C1 may be discharged without outputting the drive voltage on the output terminal OUT, thereby causing the deformable assembly to restore to the original state/shape. In this way, after the next deformation starts, the refresh of the shape of the deformation unit is implemented in a way that the row scanning signal GATE is active, and the value of the drive voltage on the drive electrode of the deformation unit is updated through the deformation data signal DATA.

Figure 7:
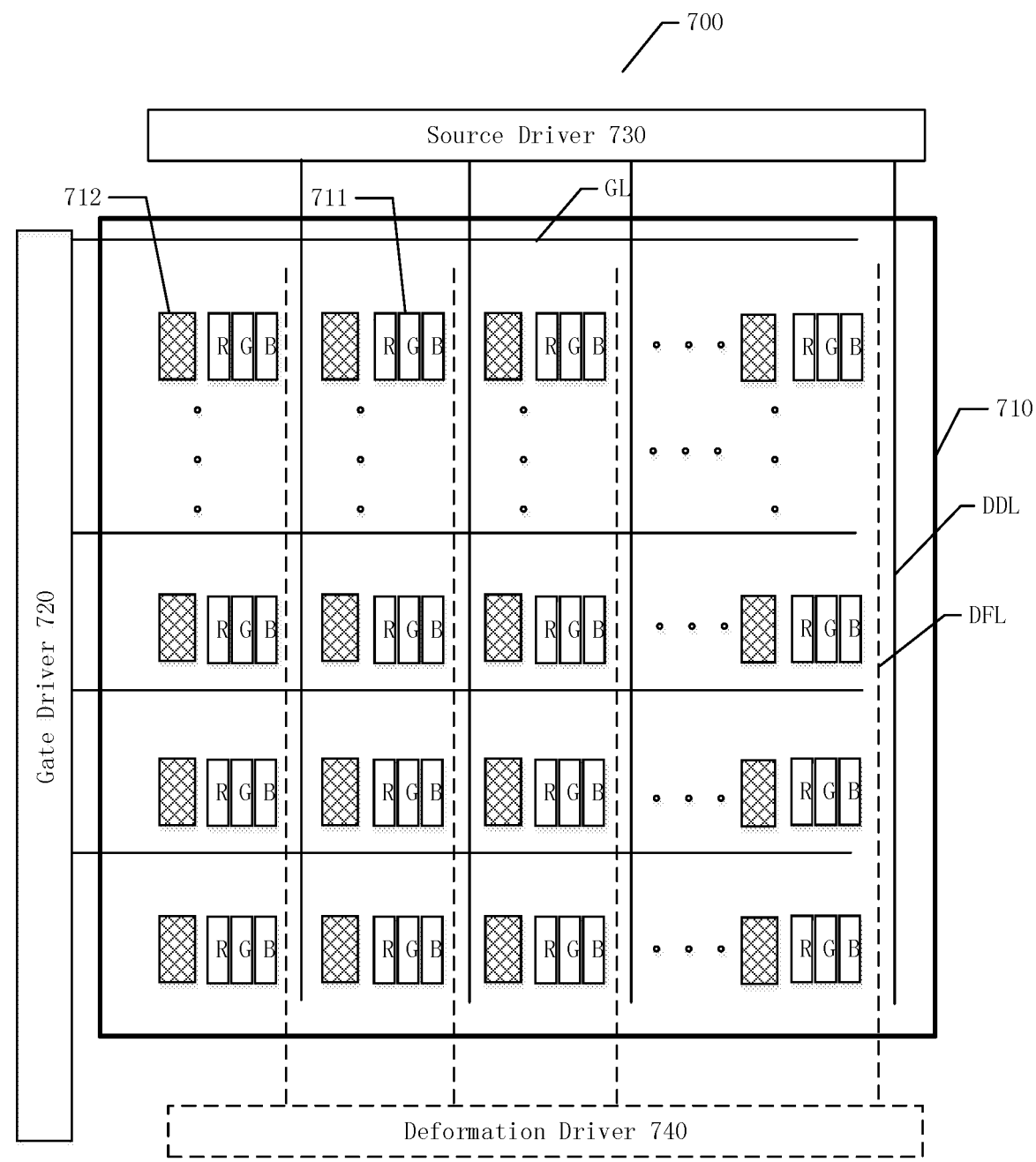
FIG. 7 shows an exemplary structural diagram of a display device according to an embodiment of the present disclosure.

FIG. 7 shows a block diagram of a display device 700 according to an embodiment of the present disclosure. Referring to FIG. 7, the display device 700 includes a display panel 710, a gate driver 720, a source driver 730 and an optional deformation driver 740. The display panel 710 may take the form of the display panel described above with reference to FIG. 2 and other display panels according to embodiments of the present disclosure.

The display panel 710 is connected to a plurality of gate lines GL extending in a first direction D1 and a plurality of display data lines DDL extending in a second direction D2 intersecting (e.g., substantially perpendicular to) the first direction D1. In some embodiments, the display panel is further connected to a plurality of deformation data lines DFL extending in the second direction D2. The gate lines GL are used to transmit the row scanning signals from the gate driver 720. The display data lines DDL are used to transmit the display data signals from the source driver 730. The deformation data lines DFL are used to transmit the deformation data signals from the deformation driver 740. The display panel 710 includes a plurality of pixel units 711 arranged in a matrix and a deformation unit 712 provided corresponding thereto. Each of the pixel units 711 may be electrically connected to a corresponding gate line and a corresponding display data line. Each of the deformation units 712 may be electrically connected to a corresponding one of the gate lines GL and a corresponding display data line or deformation data line. The display panel 710 may be a liquid crystal display panel, an Organic Light Emitting Diode (OLED) display panel, or any other suitable types of display panels.

Examples of the display device 700 include but are not limited to mobile phones, tablet computers, displays, notebook computers, digital photo frames, and navigators.

It would be appreciated that although the deformation units are shown as having a one-to-one correspondence to respective pixel units in FIG. 7, in other embodiments, one deformation unit may correspond to two or more pixel units.

In some embodiments, the "unit" described herein are representative of instructions, modules, programmable device logic and/or fixed device logic implemented in a hardware form that may be employed in some embodiments to implement at least some aspects of the techniques described herein. Hardware units may include components of an integrated circuit or on-chip system, an Application-Specific Integrated Circuit (ASIC), a Field-Programmable Gate Array (FPGA), a Complex Programmable Logic Device (CPLD), and other implementations in silicon or other hardware devices.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The invention claimed is:

1. A display panel, comprising:
   a back plate,
   a plurality of pixel units on the back plate, and
   a plurality of deformation units configured to provide haptic feedback, wherein a respective deformation unit of the plurality of deformation units is on one or more corresponding pixel units of the plurality of pixel units, and is configured to undergo a deformation corresponding to a haptic feature of a visual object displayed by the one or more corresponding pixel units responsive to application of a drive voltage;
   wherein the respective deformation unit further comprises a deformation drive circuit on the back plate, the deformation drive circuit comprises a drive unit configured to receive a deformation data signal and output the drive voltage based on the deformation data signal;
   wherein the drive unit is further configured to receive a row scanning signal, and is configured to output the drive voltage based on the deformation data signal responsive to an active state of the row scanning signal, and wherein a magnitude of the drive voltage varies with the deformation data signal.

2. The display panel according to claim 1, wherein the respective deformation unit comprises:
   a substrate;
   a deformable assembly comprising a piezoelectric material on the substrate; and
   a drive electrode configured to receive the drive voltage,
   wherein the deformable assembly comprises a free terminal and a fixed terminal, wherein the fixed terminal is attached to the substrate and connected to the drive electrode, and wherein the free terminal is configured to undergo the deformation with a predetermined strength in response to a change in the drive voltage.

3. The display panel according to claim 2, wherein the deformation drive circuit further comprises:
   a maintain unit configured to receive the drive voltage from the drive unit, and supply the drive voltage to the drive electrode during display via the one or more corresponding pixel units of the respective deformation unit, such that the respective deformation unit undergoes the deformation and maintains the deformation; and
   a reset unit configured to receive a reset signal, and reset the maintain unit in response to the reset signal, such that the maintain unit stops supplying the drive voltage to cause the deformable assembly to restore to an original state.

4. The display panel according to claim 3, wherein the deformation data signal is a display data signal configured to drive the one or more corresponding pixel units, and the drive unit is configured to output the drive voltage responsive to an active level of the display data signal.

5. The display panel according to claim 4, wherein the drive unit comprises:
   a deformation drive transistor, comprising a gate configured to receive the display data signal, a first electrode configured to be connected to a power supply voltage, and a second electrode connected to the drive electrode of the respective deformation unit; and
   a first storage capacitor comprising a first terminal connected to the second electrode of the deformation drive transistor and the drive electrode, and a second terminal that is configured to be grounded.

6. The display panel according to claim 5, wherein the reset unit comprises:
   a reset transistor, wherein the reset transistor comprises a gate configured to receive a reset signal, a first electrode connected to the first terminal of the first storage capacitor, and a second electrode that is configured to be grounded.

7. The display panel according to claim 5, wherein the drive unit further comprises:
   an isolation diode which comprises a first terminal configured to receive the display data signal and a second terminal connected to the gate of the deformation drive transistor.

8. The display panel according to claim 2, further comprising:
   a top plate on the plurality of pixel units, wherein the top plate comprises the substrate of the respective deformation unit.

9. The display panel according to claim 2, wherein the piezoelectric material is a graphene material.

10. The display panel according to claim 1, wherein the drive unit comprises:
    a deformation drive transistor, which comprises a gate configured to receive the row scanning signal, a first electrode configured to receive the deformation data signal, and a second electrode connected to the drive electrode of the respective deformation unit; and
    a first storage capacitor comprising a first terminal connected to the second electrode of the deformation drive transistor and the drive electrode, and a second terminal that is configured to be grounded.

11. The display panel according to claim 10, wherein the reset unit comprises:
    a reset transistor comprising a gate configured to receive a reset signal, a first electrode connected to a first terminal of the first storage capacitor, and a second electrode that is configured to be grounded.

12. A display device comprising the display panel according to claim 1.

13. The display device according to claim 12, wherein the respective deformation unit comprises:
    a substrate;
    a deformable assembly attached to the substrate and comprising a piezoelectric material; and
    a drive electrode configured to receive the drive voltage,
    wherein the deformable assembly comprises a fixed terminal and a free terminal, wherein the fixed terminal is attached to the substrate and connected to the drive electrode, and wherein the free terminal is configured to undergo the deformation with a predetermined strength in response to a change in the drive voltage.

14. The display device according to claim 13, wherein the deformation drive circuit further comprises:
    a maintain unit configured to receive the drive voltage from the drive unit, and supply the drive voltage to the drive electrode during display via the one or more corresponding pixel units of the respective deformation unit, such that the respective deformation unit undergoes the deformation and maintains the deformation; and
    a reset unit configured to receive a reset signal, and reset the maintain unit in response to the reset signal, such that the maintain unit stops supplying the drive voltage to cause the deformable assembly to restore an original state.

15. The display device according to claim 14, wherein the deformation data signal is a display data signal configured to drive the one or more corresponding pixel units, and the drive unit is configured to output the drive voltage responsive to an active level of the display data signal.

16. A deformation unit for providing haptic feedback in a display panel, the display panel comprising a back plate and a plurality of pixel units on the back plate, the deformation unit being on one or more corresponding pixel units of the plurality of pixel units and comprising:
a substrate;
a deformable assembly attached to the substrate and comprising a piezoelectric material, the deformable assembly comprising a free terminal and a fixed terminal attached to the substrate; and
a drive electrode configured to receive a drive voltage, wherein the fixed terminal is connected to the drive electrode, and the free terminal is configured to undergo a deformation with a predetermined strength in response to a change in the drive voltage so as to undergo the deformation corresponding to a haptic feature of a visual object displayed by the one or more corresponding pixel units;
wherein the deformation unit further comprises a deformation drive circuit on the back plate, the deformation drive circuit comprises a drive unit configured to receive a deformation data signal and output the drive voltage based on the deformation data signal;
wherein the drive unit is further configured to receive a row scanning signal, and is configured to output the drive voltage based on the deformation data signal responsive to an active state of the row scanning signal, and wherein a magnitude of the drive voltage varies with the deformation data signal.

17. The deformation unit according to claim 16, wherein the piezoelectric material is a graphene material.

18. The deformation unit according to claim 16, wherein the deformable assembly is a deformable strip.

* * * * *